No. 616,636.  
M. J. F. SCANLAN.  
VEHICLE ATTACHMENT.  
(Application filed Feb. 19, 1898.)
Patented Dec. 27, 1898.
(No Model.)
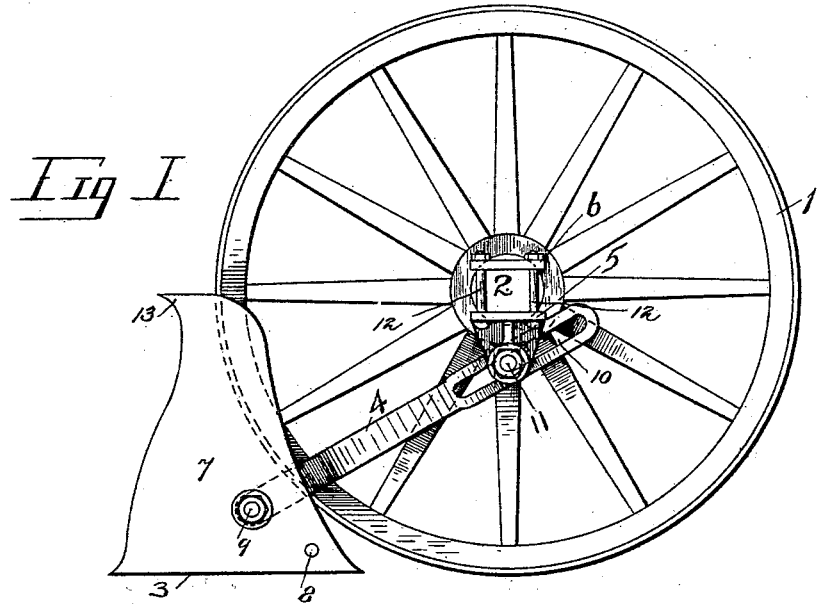
Fig. I
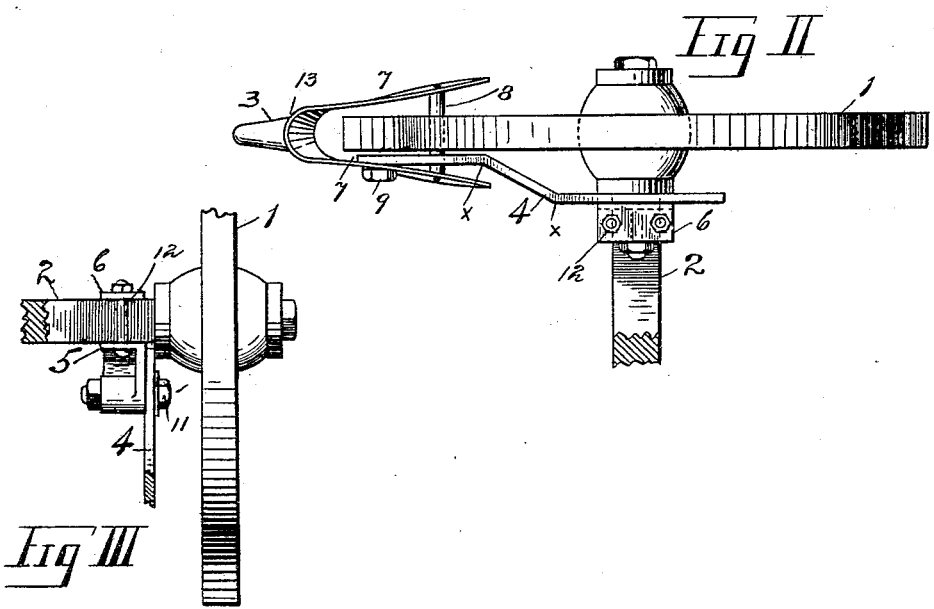
Fig. II
Fig. III
Witnesses  
Matthew J. F. Scanlan, Inventor  
By his Attorneys
THE NORRIS PETERS CO., PHOTO-LITHO., WASHINGTON, D. C.

UNITED STATES PATENT OFFICE.

MATTHEW J. F. SCANLAN, OF NEW YORK, N. Y.

VEHICLE ATTACHMENT.

SPECIFICATION forming part of Letters Patent No. 616,636, dated December 27, 1898.

Application filed February 19, 1898. Serial No. 670,967. (No model.)

*To all whom it may concern:*

Be it known that I, MATTHEW J. F. SCANLAN, a citizen of the United States of America, and a resident of the city, county, and State of New York, have invented an Improvement in Vehicle Attachments, of which the following is a specification.

My invention relates to an attachment for vehicles designed to serve as a plow or track-clearer.

The characteristic features of the invention will be fully described hereinafter and are illustrated in the accompanying drawings, in which—

Figure 1 is a side elevation of a vehicle-wheel with my improvement applied thereto. Fig. 2 is a plan view, and Fig. 3 is a sectional rear elevation of the same.

The reference-numeral 1 designates a vehicle-wheel mounted upon an axle 2.

In front of the wheel 1 is located a plow 3, of V form in cross-section and adapted to overlap the wheel, as shown. The sides or wings 7 of the plow are connected and braced by a transverse rod 8, and the plow is supported by a bar 4, the lower formed end of which is secured to one side of the plow by a bolt and nut 9. The upper end of the bar 4 is provided with an elongated slot 10 to receive a bolt 11, which secures the bar to a bracket 5, attached to the axle by spanning-plate 6 and parallel bolts 12. The bar 4 is bent at the points x to permit of its attachment to the axle on the inner side of the wheel-hub, as clearly shown in Fig. 2.

The bar 4 is adjustable longitudinally, so that the plow may be located at varying distances from the periphery of the wheel and the attachment as a whole applied to wheels of different sizes.

The function and utility of the plow will be obvious. It is designed, primarily, as a snow-plow, but will serve also to clear away mud or other obstructions in the path of a vehicle-wheel.

The upper end 13 of the plow is projected outwardly to deflect the snow or other obstruction, and the inclined sides or wings direct it laterally away from the path of the wheel.

While I have shown the device as applied to an ordinary spoke-wheel, it will be apparent that the improvement may be readily used in connection with a car-wheel to serve the purpose of a snow-plow for street-car lines as well as that of a track-clearer for wagons or like vehicles.

I claim—

1. The combination with a vehicle-axle, of a bracket secured thereto, a plow located in front of the vehicle-wheel, and means for securing and supporting the plow comprising a bar attached at its front end to the plow, and at its rear end to the bracket, said bar being longitudinally adjustable in its connection with the bracket.

2. The combination with a vehicle-axle, of a track-clearer, comprising a bracket secured to the axle, a V-shaped plow arranged in front of the wheel, and transversely braced, a bar secured to the plow at its front end, and slotted longitudinally at its rear end for attachment to said bracket.

MATTHEW J. F. SCANLAN.

Witnesses:
 LEM E. BAIL,
 GUY COOMBS.